(12) United States Patent
Hwang et al.

(10) Patent No.: US 10,623,147 B2
(45) Date of Patent: Apr. 14, 2020

(54) METHOD FOR TRANSMITTING UPLINK CONTROL INFORMATION AND USER APPARATUS FOR CARRYING OUT SAME

(71) Applicant: LG ELECTRONICS INC., Seoul (KR)

(72) Inventors: Daesung Hwang, Seoul (KR); Eunsun Kim, Seoul (KR); Seungmin Lee, Seoul (KR); Suckchel Yang, Seoul (KR); Yunjung Yi, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 16/062,083

(22) PCT Filed: Dec. 19, 2016

(86) PCT No.: PCT/KR2016/014892
§ 371 (c)(1),
(2) Date: Jun. 13, 2018

(87) PCT Pub. No.: WO2017/105158
PCT Pub. Date: Jun. 22, 2017

(65) Prior Publication Data
US 2018/0375619 A1    Dec. 27, 2018

Related U.S. Application Data

(60) Provisional application No. 62/269,101, filed on Dec. 18, 2015, provisional application No. 62/331,449, filed on May 4, 2016.

(51) Int. Cl.
*H04W 4/00* (2018.01)
*H04L 1/18* (2006.01)
(Continued)

(52) U.S. Cl.
CPC ............ *H04L 1/1812* (2013.01); *H04B 7/26* (2013.01); *H04L 1/1664* (2013.01);
(Continued)

(58) Field of Classification Search
CPC ........... H04B 7/26; H04L 1/16; H04L 1/1664; H04L 1/1671; H04L 1/18; H04L 1/1812;
(Continued)

(56) References Cited

U.S. PATENT DOCUMENTS 9,955,462 B2 * 4/2018 Chen ................... H04L 1/1635
10,362,595 B2 * 7/2019 Lee ............................ H04L 5/00
(Continued)

FOREIGN PATENT DOCUMENTS

EP        2634947      9/2013
WO    2013112703      8/2013

OTHER PUBLICATIONS

PCT International Application No. PCT/KR2016/014892, Written Opinion of the International Searching Authority dated Mar. 23, 2017, 4 pages.
(Continued)

*Primary Examiner* — Frank Duong
(74) *Attorney, Agent, or Firm* — Lee Hong Degerman Kang & Waimey

(57) ABSTRACT

Provided is a method for a user equipment (UE) for reporting uplink control information according to one embodiment of the present specification. The method may comprise the steps of: determining whether a simultaneous transmission is permitted of a first uplink control channel configured with a transmission time interval (TTI) of a first size and a second uplink control channel configured with a TTI of a second size which is different from the first size; if a simultaneous transmission is permitted, then determining if a full or partial overlap exists between a resource for the first uplink control (Continued)

channel and a resource for the second uplink control channel; and, if a full or partial overlap of resources exist, then selecting any one from among the first uplink control channel and second uplink control channel, and transmitting uplink control information to be transmitted by the first uplink control channel and second uplink control by means of the selected uplink control channel.

14 Claims, 12 Drawing Sheets

(51) Int. Cl.
| | |
|---|---|
| *H04B 7/26* | (2006.01) |
| *H04L 1/16* | (2006.01) |
| *H04L 5/00* | (2006.01) |
| *H04W 28/06* | (2009.01) |
| *H04W 72/04* | (2009.01) |

(52) U.S. Cl.
CPC .......... *H04L 1/1671* (2013.01); *H04L 1/1854* (2013.01); *H04L 1/1861* (2013.01); *H04L 5/0055* (2013.01); *H04L 5/0057* (2013.01); *H04W 28/065* (2013.01); *H04W 72/0406* (2013.01); *H04W 72/0446* (2013.01)

(58) Field of Classification Search
CPC ... H04L 1/1854; H04L 1/1861; H04L 5/0055; H04L 5/0057; H04W 28/06; H04W 28/065; H04W 72/04; H04W 72/0406; H04W 72/0446

See application file for complete search history.

(56) References Cited

U.S. PATENT DOCUMENTS

| | | | |
|---|---|---|---|
| 2013/0058282 A1 | 3/2013 | Miki et al. | |
| 2015/0223235 A1* | 8/2015 | Hwang | H04B 7/02 370/329 |

OTHER PUBLICATIONS

Huawei, "Overview of short TTI," 3GPP TSG-RAN WG1 #83, R1-156458, Nov. 2015, 7 pages.
Intel Corporation, "Discussion on TTI Shortening," 3GPP TSG-RAN WG1 #83, R1-156540, Nov. 2015, 6 pages.
Ericsson, "Overview of TTI Shortening," 3GPP TSG-RAN WG1 #83, R1-157146, Nov. 2015, 6 pages.
3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.
European Patent Office Application Serial No. 16876100.5, Search Report dated Jul. 1, 2019, 10 pages.
Motorola, "SRS Enhancements for CoMP", 3GPP TSG RAN WG1 Meeting #70, R1-123814, Aug. 2012, 7 pages.

* cited by examiner

METHOD FOR TRANSMITTING UPLINK CONTROL INFORMATION AND USER APPARATUS FOR CARRYING OUT SAME

CROSS-REFERENCE TO RELATED APPLICATIONS

This application is the National Stage filing under 35 U.S.C. 371 of International Application No. PCT/KR2016/014892, filed on Dec. 19, 2016, which claims the benefit of U.S. Provisional Application No. 62/269,101, filed on Dec. 18, 2015, and 62/331,449, filed on May 4, 2016, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be generally divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

For a next-generation mobile communication system, it is considered to set various transmission time intervals (TTIs) for specific or all physical channels in order to meet requirements for various application fields. For example, a TTI used for transmission of a physical channel, such as a PDSCH, a PUSCH, or a PUCCH, may be set to be less than 1 msec in order to reduce latency in communication between a base station and a UE. Further, different TTIs array be set for a plurality of physical channels in one subframe.

As such, in reducing or extending a TTI for physical channel transmission, scheduling needs to be efficiently performed in order to increase spectral efficiency. To efficiently perform scheduling, latency in reporting channel state information (CSI) needs to be changed. Therefore, there are required methods for effectively transmitting CSI when a TTI for physical channel transmission is reduced or extended.

SUMMARY OF THE INVENTION

A disclosure of the present specification has been made in an effort to solve the aforementioned problem.

To achieve the foregoing purposes, one embodiment of the present invention provides a method for reporting, by a user equipment (UE), uplink control information. The method may include: determining whether simultaneous transmission of a first uplink control channel configured with a transmission time interval (TTI) with a first size and a second uplink control channel configured with a TTI with a second size, which is different from the first size, is allowed; determining whether a resource for the first uplink control channel and a resource for the second uplink control channel entirely or partly overlap when the simultaneous transmission is allowed; selecting either the first uplink control channel or the second uplink control channel when the resources entirely or partly overlap; and transmitting, through the selected uplink control channel, pieces of uplink control information to be transmitted through the first uplink control channel and the second uplink control channel. Here, the first size may be smaller than the second size. Specifically, the second size may be 1 millisecond, and the first size may be less than 1 millisecond.

The transmitting of the pieces of uplink control information may transmit, through the second uplink control channel, the pieces of uplink control information to be transmitted through the first uplink control channel and the second uplink control channel, by piggybacking uplink control information to be transmitted through the first uplink control channel on the second uplink control channel. The transmitting of the pieces of uplink control information may jointly code the same type of uplink control information among the pieces of uplink control information to be transmitted through the first uplink control channel and the second uplink control channel and may transmit the uplink control information through the second uplink control channel. The transmitting of the pieces of uplink control information may separately code the pieces of uplink control information to be transmitted through the first uplink control channel and the second uplink control channel on the basis of a TTI size and may transmit the uplink control information through the second uplink control channel.

The transmitting of the pieces of uplink control information may transmit, through the first uplink control channel, the pieces of uplink control information to be transmitted through the first uplink control channel and the second uplink control channel, by repeatedly transmitting the pieces of uplink control information.

The determining whether the simultaneous transmission is allowed may determine whether the simultaneous transmission of the first uplink control channel and the second uplink control channel is allowed on the basis of high-layer signaling.

To achieve the foregoing purposes, another embodiment of the present invention provides a wireless device for reporting uplink control information. The wireless device may include: a radio frequency (RF) unit to transmit and receive a radio signal; and a processor to control the RF unit. The processor may: determine whether simultaneous transmission of a first uplink control channel configured with a transmission time interval (TTI) with a first size and a second uplink control channel configured with a TTI with a second size, which is different from the first size, is allowed; determine whether a resource for the first uplink control channel and a resource for the second uplink control channel entirely or partly overlap when the simultaneous transmission is allowed; select either the first uplink control channel or the second uplink control channel when the resources entirely or partly overlap; and transmit, through the selected uplink control channel, pieces of uplink control information to be transmitted through the first uplink control channel and the second uplink control channel.

According to embodiments of the present specification, when a TTI for physical channel transmission is reduced or extended, it is possible to efficiently transmit uplink control information (UCI).

DESCRIPTION OF EXEMPLARY EMBODIMENTS

Figure 1:
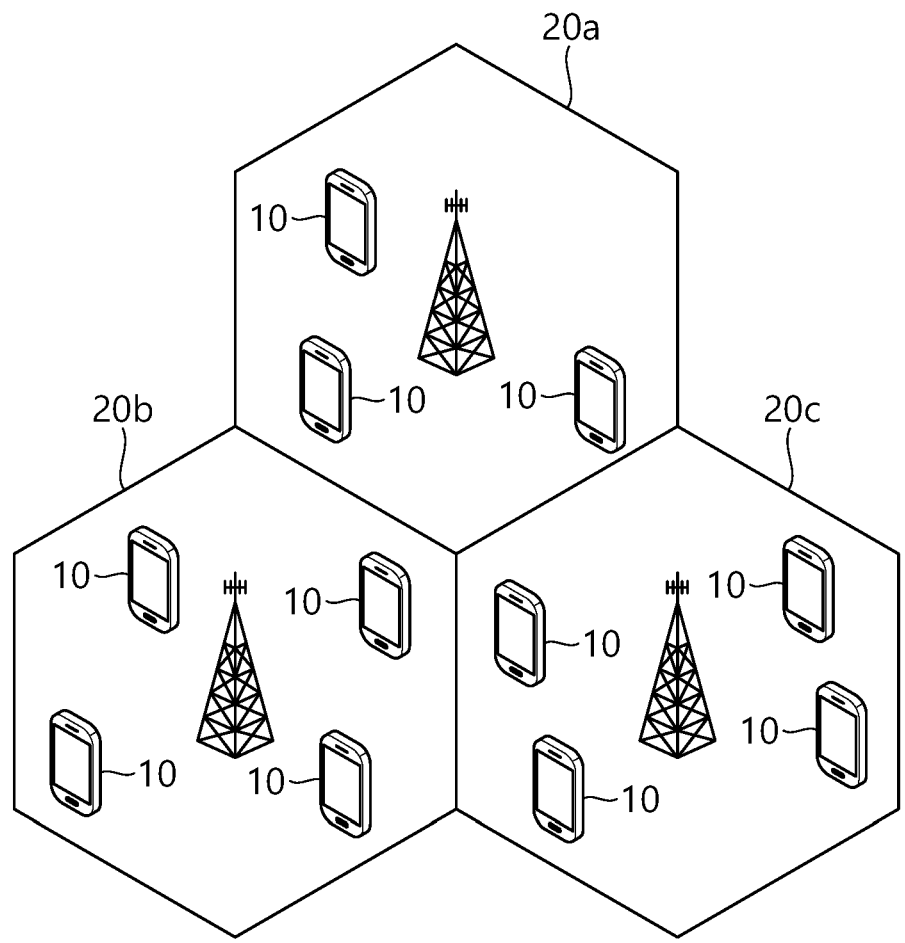
FIG. 1 shows a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna.

Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
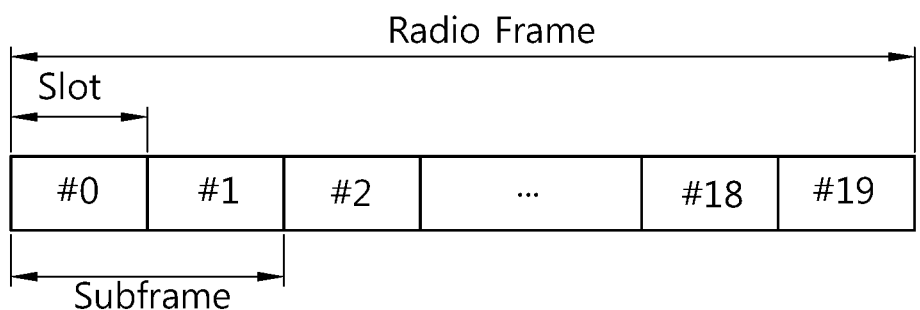
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
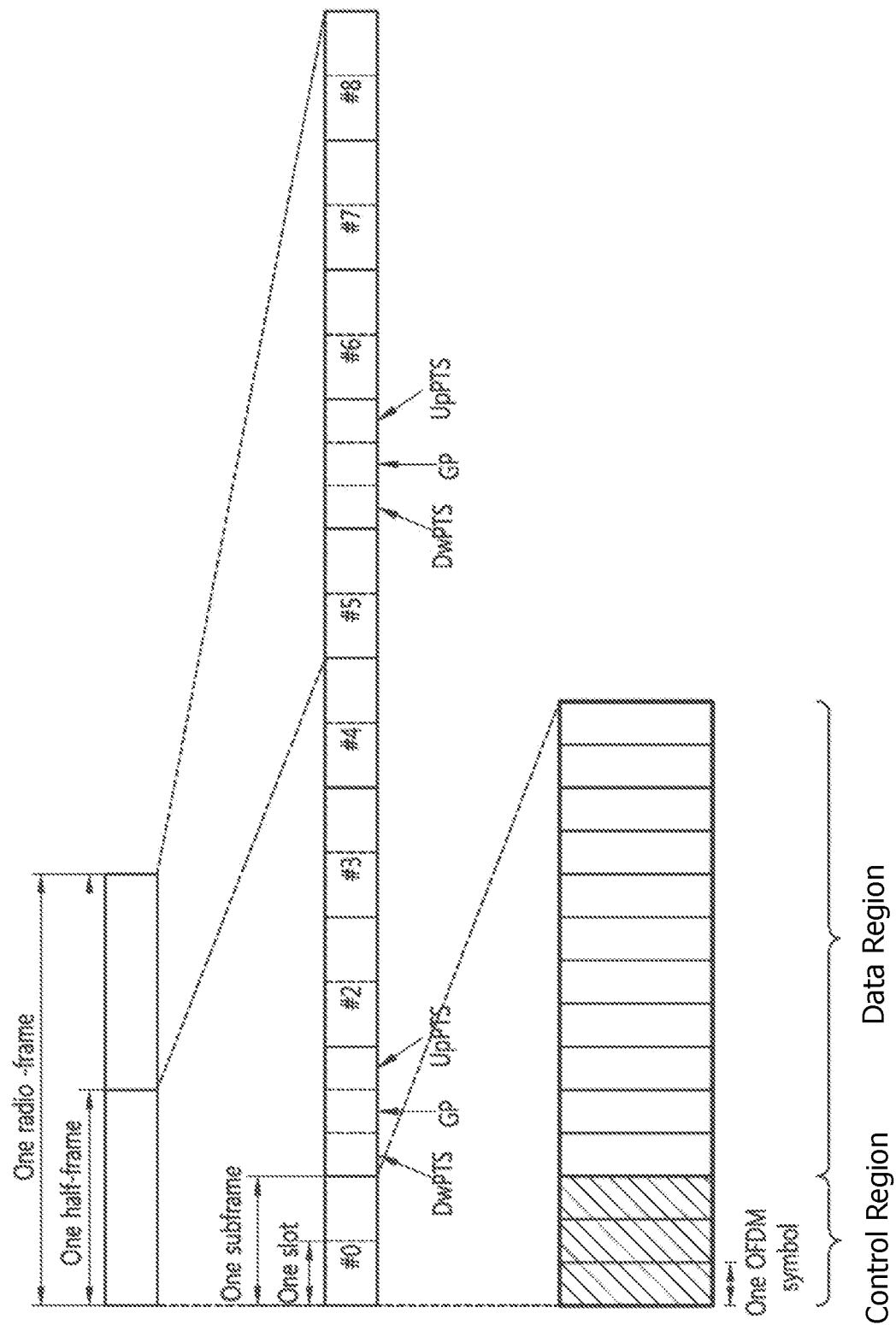
FIG. 3 illustrates the architecture of a downlink radio frame according to TDD of 3GPP LTE.

FIG. 3 illustrates the architecture of a downlink radio frame according to TDD of 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, 01-DM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). In the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Con-figuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
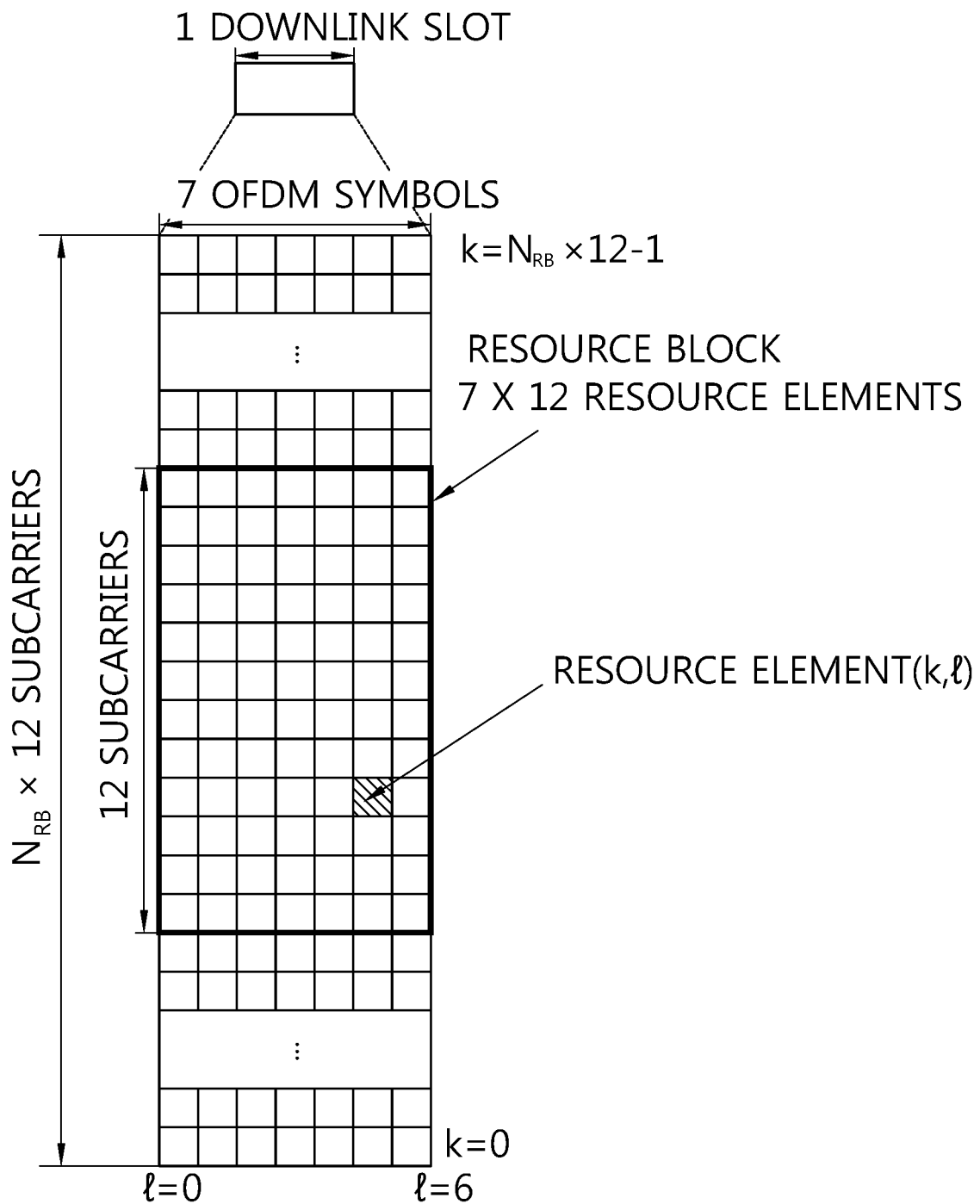
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
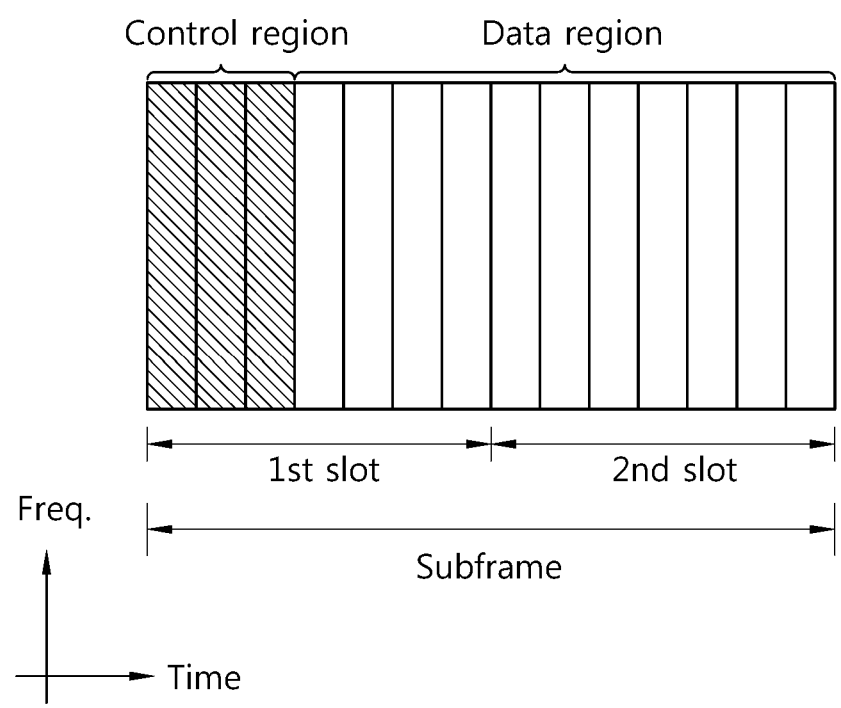
FIG. 5 illustrates the architecture of a downlink sub-frame.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six 01-DM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO (Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 |
| Mode 9 | DCI format 1A | Common and UE-specific | Non-MBSFN subframe: If the number of PBCH antenna ports is 1, then port 0 is used as the sole antenna port; otherwise, the transmit diversity is used. MBSFN subframe: single antenna port, port 7 |
|  | DCI format 2C | UE-specific | Up to eight transport layers, ports 7-14 are used, or port 7 or port 8 is used as the sole antenna port |
| Mode 10 | DCI format 1A | Common and UE-specific | Non-MBSFN subframe: If the number of PBCH antenna ports is 1, then port 0 is used as the sole antenna port; otherwise, the transmit diversity is used. MBSFN subframe: single antenna port, port 7 |
|  | DCI format 2D | UE-specific | Up to eight transport layers, ports 7-14 are used, or port 7 or port 8 is used as the sole antenna port |

The use of the DCI format is divided into the following table.

TABLE 3

| DCI format | Contents |
| --- | --- |
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |
| DCI format 4 | Used for PUSCH scheduling of uplink (UL) cells operating in multi-antenna port transmission mode |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
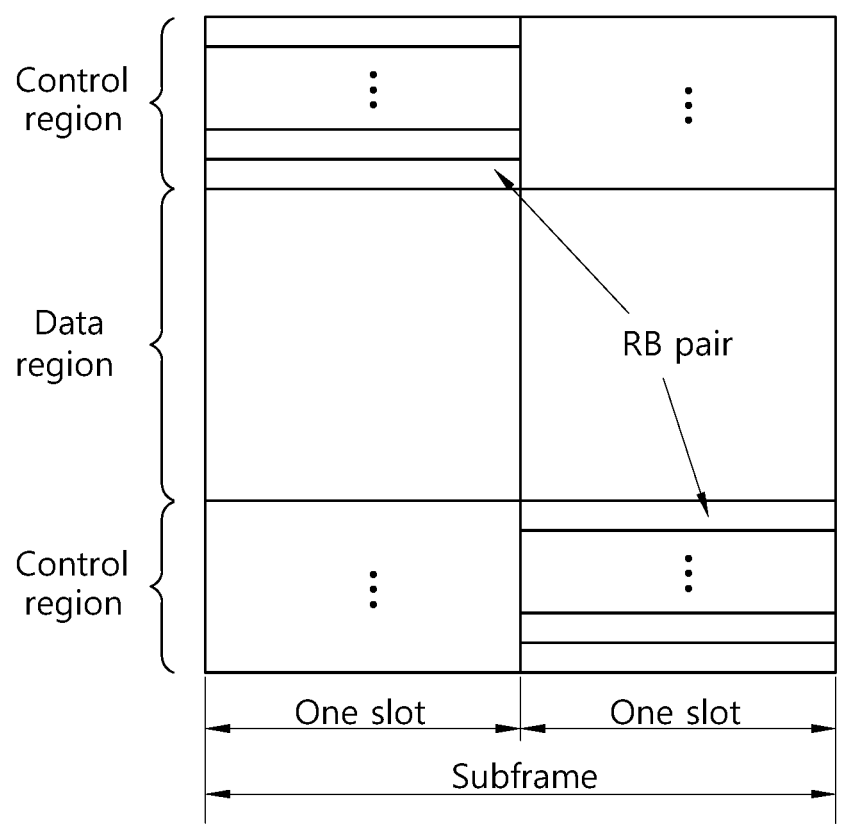
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information.

<Carrier Aggregation (CA)>

A carrier aggregation system is now described.

Figure 7:
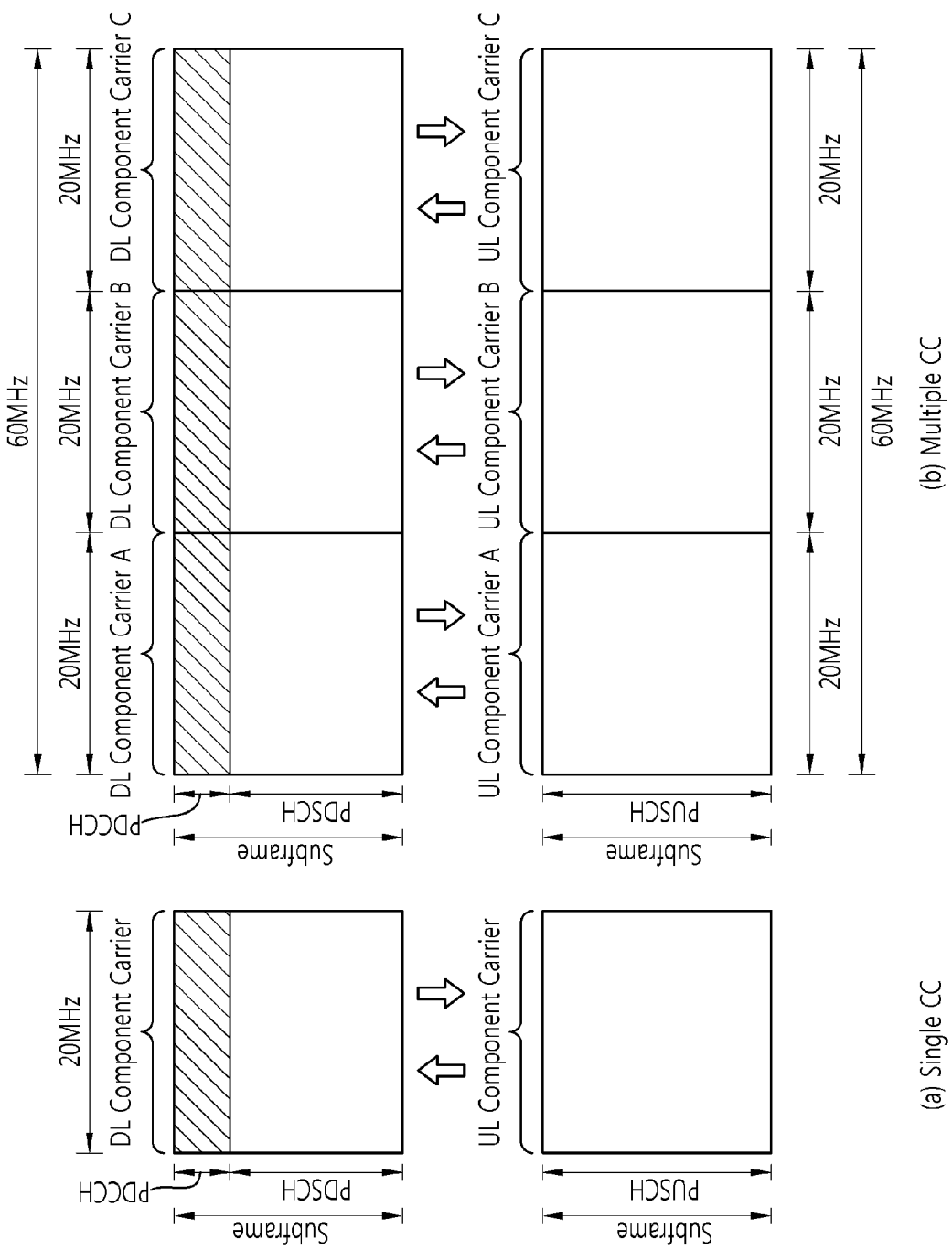
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
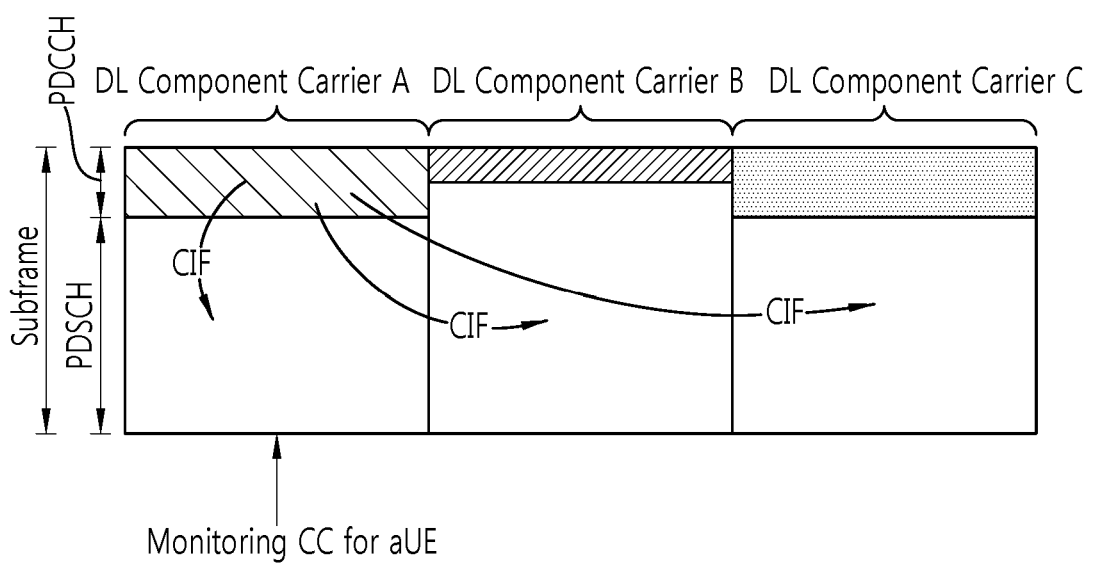
FIG. 8 exemplifies cross-carrier scheduling in the carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

For a next-generation mobile communication system, it is considered to set various transmission time intervals (TTIs) for specific or all physical channels in order to meet requirements for various application fields. For example, a TTI used for transmission of a physical channel, such as a PDSCH, a PUSCH, or a PUCCH, may be set to be less than 1 msec in order to reduce latency in communication between a base station and a UE. Further, different TTIs may be set for a plurality of physical channels in one subframe.

Disclosure of the Present Specification

As described above, in reducing or extending a TTI for physical channel transmission, scheduling needs to be efficiently performed in order to increase spectral efficiency. To efficiently perform scheduling, latency in reporting channel state information (CSI) needs to be changed.

Accordingly, one embodiment of the present invention proposes methods for effectively transmitting CSI when a TTI for physical channel transmission is reduced or extended.

Specifically, methods for applying a reduced or extended TTI even to CSI reporting are considered. Further, in transmitting a plurality of pieces of uplink control information (UCI), methods for transmitting various pieces of CSI in a shorter time by reducing a timing gap between pieces of UCI are considered.

CSI may include a rank indicator (RI), a precoding matrix indicator (PMI) for a wideband or a subband, and a channel quality indicator (CQI) for a broadband or a subband. Periodic CSI reporting types may be distinguished depending on UCI types that can be transmitted simultaneously over one physical channel. For example, in LTE, a CSI reporting type including an RI (which may further include a broadband PMI) is the highest priority, and other CSI reporting types have the same priority. In this case, CSI reporting types having the same priority may be prioritized according to a CSI process ID, a cell index, or a subframe set index. Such priorities of CSI reporting types may be considered when some periodic CSI needs to be selected.

In the following description, a TTI of a general subframe size (1 msec) is referred to as a normal TTI, and a TTI of a size smaller than the general subframe size is referred to as a shortened TTI. Further, although the following description is made with reference to a shortened TTI, it is obvious that the same description can be applied to a TTI of a size larger than the general subframe size (i.e., an extended TTI).

1. Method for Setting TTI for Periodic CSI Reporting

CSI reporting types may have different bit sizes (i.e., numbers of bits) or priorities depending on the type. For example, a CSI reporting type including an RI may be limited to up to 3 bits on the basis of a single serving cell, while a CSI reporting type including a PMI or a CQI may include 11 bits.

Figure 9:
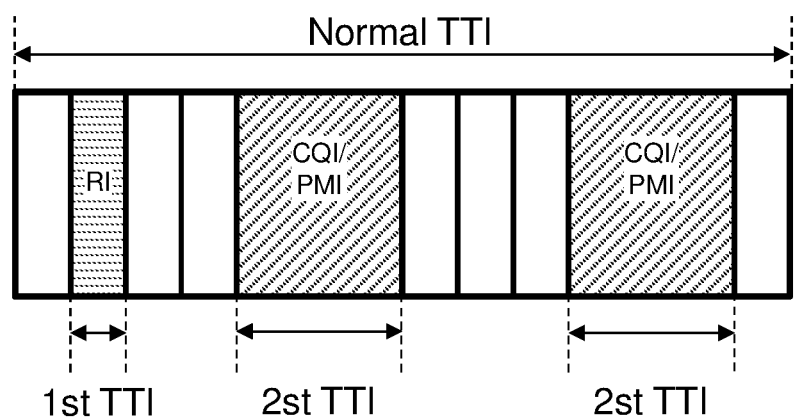
FIG. 9 illustrates an example where the size of a TTI varies according to the CSI reporting type.

FIG. 9 illustrates an example where the size of a TTI varies according to the CSI reporting type.

In order to reduce a TTI for CSI reporting, some symbols (e.g., symbols 1/2/3/4) of a normal TTI may be adopted to configure a shortened TTI. Space for data mapping may be limited in the shortened TTI. Thus, when there is a great amount of data, a TTI size that can be reduced may also be limited. For example, a TTI for a CSI reporting type including an RI may be reduced more substantially than that for a CSI reporting type including a CQI or PMI.

Thus, as shown in FIG. 9, a TTI may be configured to have a different size depending on the type (or group) of UCI or the CSI reporting type (or group). Alternatively, a TTI may be configured to have a different size depending on the size of UCI or the size of a CSI reporting type.

To set a different TTI size, a CSI configuration or a latency configuration may be indicated through high-layer signaling. Specifically, a TTI size may be set differently as follows.

Option 1: A TTI size may be set through a different high-layer signal for each UCI type (or group) or CSI reporting type (or group).

Option 2: A TTI size may be set through one high-layer signal regardless of the UCI type or CSI reporting type. In this case, the high-layer signal may specify a TTI size in a set form according to the UCI type or the CSI reporting type. In addition, a TTI size may be set through a different high-layer signal for each UCI type (e.g., HARQ-ACK, SR, or CSI) and may be set through a single parameter within a CSI reporting type.

Option 3: The same TTI size may be set for one periodic CSI reporting mode. For example, a TTI size may be set when a CSI or CQI configuration is set in a high layer.

A UE may perform a plurality of CSI reports, for example, the UE performs periodic CSI reporting to a plurality of serving cells. Therefore, a TTI may be configured to have a different size for each of the plurality of CSI reports performed by the UE.

In this case, priority rules for CSI reporting may be considered in view of a TTI size. Specifically, when mobile communication is used in an urgent and latency-sensitive situation, a TTI needs to be short. Therefore, the priority rules may be set considering a TTI size prior to a CSI reporting type such that a smaller TTI has a higher priority. Alternatively, when CSI reporting types have the same priority, the priority rules may be set in view of a TTI size.

More specifically, for the same cell or cell group, progressive-CSI (P-CSI) to be transmitted or dropped may be selected according to priority rules based on a CSI reporting type and/or a CSI processing identifier, instead of applying a criterion based on a TTI size. Alternatively, for different cells or cell groups, considering a TTI size prior to a CSI reporting type, P-CSI to be transmitted or dropped may be selected according to a rule such that a smaller TTI has a higher priority. The UE may select and transmit P-CSI with a size determined in advance according to the selected priority rule or indicated by a high layer.

Alternatively, assuming that a common TTI size is used for CIS reporting in a single cell group, a TTI size used for CSI reporting or a CSI feedback transmission period may be set separately from a TTI size set for each cell. Specifically, when configurations, such as periodic CSI for a cell group, are received as an aggregation, a CSI feedback period may be set to the smallest TTI size, may be set according to a TTI size for a reference cell, or may be set through a higher-layer signal. In this case, the reference cell may be any of a PCell, a pSCell, a SCell transmitting a PUCCH, and a master SCell in each cell group. A TTI size may be a TTI operating as reference timing.

As described above, a TTI to be set may be set in a form, for example, a mini-subframe, which is a unit smaller than one subframe. A unit for a mini-subframe may be set to the smallest TTI size, a TTI size set on a reference carrier, or a TTI operating as reference timing. A unit for a mini-subframe operating in each cell may be common, and the size of a sTTI corresponding to a plurality of mini-subframes may be set differently for each carrier. Alternatively, it may be applied only in carrier aggregation that the size of a sTTI corresponding to a plurality of mini-subframes is set for each carrier. That is, a mini-subframe size and a TTI size may basically be set differently for each carrier. However, when carrier multiplexing is needed, a definition of a reference TTI size or mini-subframe size may be provided. Here, carrier multiplexing is needed in cross-carrier scheduling or UCI multiplexing. A definition of a reference TTI size or mini-subframe size may be provided not only in latency reduction or TTI shortening but also in the coexistence of various sizes of TTIs or mini-subframes, such as new radio access technologies.

Meanwhile, it may be considered to change the number of constituent RBs for a PUCCH to be transmitted according to the UCI type or the CSI reporting type. In this case, a TTI may be defined to have the same size, and the number of constituent RBs for a PUCCH may be set to change instead. That is, the same TTI size may be set regardless of the CSI reporting type, and the number of constituent RBs may be set to change according to the CSI reporting type at each transmission time. For example, the number of constituent RBs for a PUCCH including an RI may be set to be smaller than that for a PUCCH including only a CQI. In this method, the number of RBs may be set to change depending on the size of UCI rather than a CSI reporting type.

2. Periodic CSI Reporting Mode with Multiple TTIs or Shortened TTI

CSI change information tends to significantly depend on the mobility of a UE or a BS, and CSI is hardly regarded as being changed by a change in a TTI. Therefore, the period of periodic CSI does not highly need to be changed. However, for a shortened TTI, it is necessary to specify a position for transmitting a periodic CSI report within a particular subframe. The time at which periodic CSI reporting for a shortened TTI can start may be set as follows.

Option 1: A subframe set by a normal TTI-based CSI/CQI configuration is specified. In this case, the subframe may be specified by a combination of a period and an offset. A position (i.e., a symbol index) at which periodic CSI reporting for a shortened TTI can start within the specified subframe is set by high-layer signaling. Specifically, a symbol index at which periodic CSI reporting for a shortened TTI can start may be commonly specified for a shortened TTI. Alternatively, a symbol index at which periodic CSI reporting for a shortened TTI can start may be set differently depending on the size of a shortened TTI. In addition, a symbol index at which periodic CSI reporting for a shortened TTI can start may be set in configuring a periodic CSI report. When it is impossible to transmit periodic CSI, all or part of P-CSI may be dropped. For example, when a periodic CSI report collides with a HARQ ACK/NACK, all or part of P-CSI may be dropped.

Option 2: A subframe set by a normal TTI-based CSI/CQI configuration is specified. In this case, the subframe may be specified by a combination of a period and an offset. A position (i.e., a symbol index) at which periodic CSI reporting for a shortened TTI can start within the specified subframe is flexibly set according to a signal transmitted by a UE at a corresponding time. Specifically, when the UE transmits only P-CSI, the position may be set according to option 1 described above, or the position may be set to be the start position of the earliest TTI in the subframe. When it is impossible to transmit periodic CSI, a P-CSI report may be delayed and transmitted in the next TTI. For example, when a periodic CSI report collides with a HARQ ACK/NACK, P-CSI may be transmitted in the next TTI.

Option 3: A period and an offset used in a normal TTI-based CSI/CQI configuration are determined and applied for a symbol index or symbol group index (e.g., a symbol group index may be indexed by x symbols) at which periodic CSI reporting for a shortened TTI starts. Specifically, the period and the offset may be set differently for each TTI size through high-layer signaling. Alternatively, the period and the offset may be set to be the same, and the period and the offset which are the same may be applied differently depending on the TTI size. For example, the same set period may be multiplied by the number of shortened TTIs in a subframe according to the TTI size, thereby determining an actual period for a shortened TTI. When it is impossible to transmit periodic CSI, all or part of P-CSI may be dropped. For example, when a periodic CSI report collides with a HARQ ACK/NACK, all or part of P-CSI may be dropped.

Option 4: When shortened TTI-based downlink transmission occurs in a sudden burst, it may be insufficient in terms of radio resources to transmit CSI on a short period, such as a plurality of TTIs. In this case, it may be appropriate to perform CSI feedback in a burst manner before and after a period in which the downlink transmission is performed. Therefore, it may be considered to perform CSI feedback in a burst manner Specifically, during a period in which CSI feedback is transmitted, a period and an offset may be set in the form of a symbol index, a symbol group index, or a TTI index in a CSI/CQI configuration. The symbol index, the symbol group index, or the TTI index may be set to be different for each TTI or TTI group.

The period during which the CSI feedback is transmitted or a period during which the CSI feedback is not transmitted may be set by high-layer signaling. Specifically, the period during which the CSI feedback is transmitted or the period during which the CSI feedback is not transmitted may be set by an additional period and an additional offset. The period during which the CSI feedback is transmitted or the period during which the CSI feedback is not transmitted may be set to be a particular window period after a certain time (which may be a TTI unit) after a particular sPDCCH (PDCCH in a shortened TTI) is detected. In this case, the window period may be set in advance or may be set by high-layer signaling. Also, the particular sPDCCH may be a channel for unicast or may be a form including third DCI that does not schedule a data channel. The sPDCCH may indicate a CSI transmission period through DCI information with a particular field introduced for CSI indication.

In addition, the period during which the CSI feedback is transmitted or the period during which the CSI feedback is not transmitted may be set such that the CSI feedback is implicitly activated after a UE transmits a buffer status report (BSR), a scheduling request (SR) or a random access channel (RACH). Alternatively, periodic CSI feedback may be allowed through a random access response (RAR) or message 4 of a RACH procedure. In this case, CSI reporting may be triggered similarly to aperiodic CSI reporting, but may be performed over a long term on the basis of a periodic CSI report or may transmit a CQI or a limited PMI.

3. Multiple UCI Transmission for Multiple TTIs or Shortened TTI

For a UE, a TTI size may be set to be different for a HARQ ACK, a SR, and periodic CSI reporting.

Figure 10:
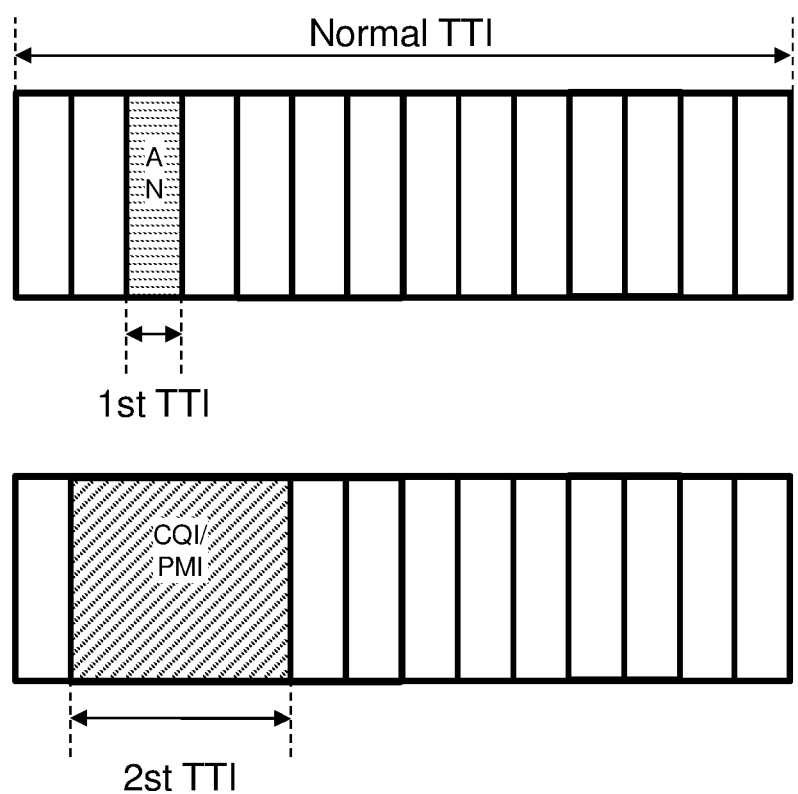
FIG. 10 illustrates an example of a collision between pieces of UCI having different TTI sizes.

FIG. 10 illustrates an example of a collision between pieces of UCI having different TTI sizes.

As shown in FIG. 10, pieces of UCI having different TTI sizes may entirely or partly overlap. In this case, one of the two colliding pieces of UCI may be selected and transmitted, and the other UCI that is not selected may be dropped. Alternatively, the two colliding pieces of UCI may be transmitted simultaneously. When the two colliding pieces of UCI are transmitted at the same time, it is necessary to decide which TTI of the TTIs of the two pieces of UCI to follow. A shortened TTI may generally be utilized in a limited latency environment and may not be suitable for use in an environment where a TTI for a particular channel is increased. For example, a four-symbol TTI may be used to transmit a HARQ ACK, transmitted on one-symbol TTI, simultaneously with CSI. In this case, timing for the HARQ ACK may be changed and overall latency may be increased.

Therefore, when the HARQ ACK and a periodic CSI report entirely or partly overlap, a UE may operate as follows.

Option 1: Regardless of whether simultaneous transmission of the HARQ ACK and the periodic CSI report is set by a high layer, the UE may prioritize HARQ ACK transmission in operation. Specifically, the UE may transmit only a physical channel for the HARQ ACK and may drop the periodic CSI report. When the periodic CSI report is already being transmitted, the UE may stop transmitting the periodic CSI report before the HARQ ACK is transmitted or may stop periodic CSI reporting during a period in which the HARQ ACK is transmitted.

More specifically, it is possible to determine whether to simultaneously transmit the HARQ ACK and the periodic CSI report according to the size of a TTI set in each UCI or the time at which transmission of the HARQ ACK is terminated. For example, when the time at which simultaneous transmission of the HARQ ACK and the periodic CSI report is terminated is not later than the time at which transmission of only the HARQ ACK is transmitted, the UE may support simultaneous transmission of the HARQ ACK and the periodic CSI report. Alternatively, considering processing time for the HARQ ACK, when the transmission start time of the HARQ ACK is the same as that of the periodic CSI report or when the difference in transmission start time between the HARQ ACK and the periodic CSI report is a preset value or less, the UE may support simultaneous transmission of the HARQ ACK and the periodic CSI report. In this case, the difference in transmission start time between the HARQ ACK and the periodic CSI report to support the simultaneous transmission may be set in advance or may be set by high-layer signaling.

Option 2: Regardless of whether simultaneous transmission of the HARQ ACK and the periodic CSI report is set by a high layer, the UE may prioritize transmission of a particular PUCCH in operation. In this case, the particular PUCCH may be transmitted with a corresponding TTI, in which the TTI having a smaller size is allocated a higher priority. For example, when a sPDSCH or application corresponding to the HARQ ACK is different from an application corresponding to CSI, transmission of a PUCCH that has a small representative TTI size and thus is determined to be urgent may be prioritized. In this case, the size of the representative TTI may be different from the size of an actual TTI for the PUCCH.

Option 3: When simultaneous transmission of the HARQ ACK and the periodic CSI report is set by a high layer, TTI sizes and/or transmission start times for the two pieces of UCI may be set to be the same. In this case, some UCI may be dropped or resized. Alternatively, the number of REs may be extended for transmission of a particular PUCCH. Extending the number of REs may increase the number of RBs for PUCCH transmission. When the simultaneous transmission of the HARQ ACK and the periodic CSI report is not set in the high layer, similarly to option 1 or 2, either a PUCCH including the HARQ ACK or a PUCCH for transmitting the periodic CSI report may be prioritized, or transmission of a PUCCH selected in accordance with a criterion, such as a representative TTI size, may be prioritized.

Option 3-1: The UE may simultaneously transmit the HARQ ACK and the periodic CSI report using a PUCCH with a large TTI size. In this case, the PUCCH with the large TTI size may be a PUCCH for transmitting the periodic CSI report. Timing for the HARQ ACK may be changed differently when the HARQ ACK is transmitted alone.

Option 3-2: The UE may support simultaneous transmission only in a period where the HARQ ACK and the periodic CSI report overlap. In this case, transmission of a PUCCH for transmitting the periodic CSI report or a PUCCH having a late transmission end time may be changed from transmission of a single PUCCH to transmission of a plurality of PUCCHs. The transmission of the plurality of PUCCHs means that UCI is separately coded for each PUCCH or each PUCCH group (feedback in which the periodic CSI report and the HARQ ACK are simultaneously transmitted or feedback in which the periodic CSI report is transmitted alone). For example, when the transmission start position of the periodic CSI report is the same as that of the HARQ ACK, the periodic CSI report is transmitted before the HARQ ACK, or the periodic CSI report is transmitted after the HARQ ACK, option 3-2 may be used. Specifically, when the end time of the periodic CSI report is later than that of the HARQ ACK, a PUCCH transmitting only the periodic CSI report before transmitting the HARQ ACK, a PUCCH simultaneously transmitting the HARQ ACK and the periodical CSI report, and a PUCCH transmitting only the periodic CSI report may be separately transmitted.

Option 3-3: The UE may simultaneously transmit different PUCCH resources set for respective UCI types. In this case, a particular UE may transmit a plurality of PUCCHs only in a period where the transmission times of the HARQ ACK and the periodic CSI report overlap. Specifically, when the UE is capable of multi-cluster transmission, when simultaneous transmission of a PUCCH and a PUCCH with a shortened TTI (i.e., sPUCCH) is set, or when simultaneous transmission of a PUCCH and a PUSCH is set, the UE may be restricted to simultaneously transmit different PUCCH resources set for respective UCI types. In this case, the plurality of PUCCHs may not at least partly overlap in the frequency domain. In other cases, all or some of pieces of UCI may be transmitted through a single PUCCH. Specifically, when a PUSCH is transmitted while a PUCCH is transmitted (that is, when the PUCCH and the PUSCH are set to be simultaneously transmitted) or when PUCCHs and PUSCHs partly overlap, the UE may not simultaneously transmit a plurality of PUCCHs or sPUCCHs but may simultaneously transmit a particular PUCCH or a sPUCCH and a PUSCH.

A parameter for simultaneous transmission of the HARQ ACK and the CSI may be provided independently for each TTI size or TTI size group. Alternatively, simultaneous transmission of the HARQ ACK and the CSI is indicated by the same parameter but may also be indicated by different values for each TTI size or TTI size group. In this case, a TTI size may be a representative value (e.g., a TTI for a PDSCH) for the UE or a TTI size for particular UCI (e.g., HARQ ACK or CSI). Also, a parameter for simultaneous transmission of a PUSCH and a PUCCH may exist independently for each TTI size or TTI size group. For example, when a PUSCH corresponds to a normal TTI and a PUCCH corresponds to a shortened TTI and when both a PUCCH and a PUSCH correspond to a shortened TTI, simultaneous transmission of a PUCCH and a PUSCH may be set through an independent high-layer parameter.

The HARQ ACK described above may be transmitted simultaneously with a SR. In addition, even when simultaneous transmission of the SR and the periodic CSI report is supported, the foregoing options may be applied.

When the HARQ ACK or CSI is transmitted through a shortened TTI, it may be set through a high layer whether to perform puncturing in terms of of transmission with an extended TTI. When a setting for puncturing is deactivated, a lower channel may be dropped in order of priority. Alternatively, when the setting for puncturing is activated and the two pieces of UCI transmitted through the shortened TTI cannot be transmitted at the same time, the two pieces of UCI may be transmitted by performing puncturing.

For a next-generation system, it is considered to utilize or develop a SR-based PUSCH transmission procedure in order to reduce latency in uplink access. Basically, a time resource for a SR may be set more densely. For example, the time resource for the SR may be set to one TTI period.

A collision between PUCCHs having different TTI sizes for the same UCI may be considered. For example, a conventional PUCCH including 14 symbols and a shortened PUCCH (i.e., sPUCCH) including a relatively small number of symbols may occur at the same time. In this case, the same UCI (e.g., HARQ ACK/NACK) may be transmitted on each of the PUCCH and the sPUCCH, and different types of UCI may be transmitted on the PUCCH and the sPUCCH, respectively. The PUCCH and the sPUCCH may be transmitted on the same carrier (or serving cell) or may be transmitted in different serving cells in carrier aggregation.

Briefly, it may be considered to allow simultaneous transmission of the PUCCH and the sPUCCH. In this case, UCI corresponding to the sPUCCH and UCI corresponding to the PUCCH may be transmitted through respectively allocated channels. However, simultaneous transmission of the PUCCH and the sPUCCH may not be suitable in terms of single carrier characteristics or power consumption. Therefore, whether to perform simultaneous transmission of the PUCCH and the sPUCCH may be set in a high layer. Such setting in the high layer may be performed regardless of whether the transmission is performed in the same serving cell. Such setting in the high layer may be performed independently for each serving cell through high-layer signaling. Alternatively, such setting in the high layer may be performed via high-layer signaling depending on whether the transmission is transmission in the same serving cell or between different serving cells.

When simultaneous transmission of the PUCCH and the sPUCCH is not supported, when simultaneous transmission of the PUCCH and the sPUCCH is not set by the high layer, or when simultaneous transmission of the PUCCH and the sPUCCH is supported but a collision occurs between frequency resources for the PUCCH and the sPUCCH, particular UCI may be dropped or may piggyback on another channel Examples of a UCI transmission scheme are illustrated as follows.

Option 1: All or some of pieces of UCI are transmitted via a PUCCH. In this case, the UCI may be a UCI set or subset to be transmitted on the PUCCH and the sPUCCH. Generally, since coverage for the PUCCH may be wider than coverage for the sPUCCH, and the payload of the PUCCH may also be likely to be greater than that of the sPUCCH, it may be appropriate to transmit a plurality of pieces of UCI via the PUCCH. However, in exceptional cases (especially for a HARQ ACK), a sPDCCH/s PDSCH for a shortened TTI may be received or decoded while generating and encoding the UCI for the PUCCH. In this case, due to transmitting the UCI via the PUCCH, encoding time for the entire UCI may be insufficient. Therefore, UCI piggybacking may be adjusted depending on the time when the PUCCH and the sPUCCH overlap or the difference between the start or end times of a PDCCH/PDSCH and a sPDCCH/sPDSCH. For example, when it is determined that scheduling prediction is possible, the UCI of the sPUCCH may be piggybacked on the PUCCH. In other cases, the UCI may be transmitted via any one selected from the PUCCH and the sPUCCH.

Option 1-1: All pieces of UCI to be transmitted via a PUCCH may be jointly coded. In this case, considering encoding time, joint coding of the UCI may be performed only when the time when the PUCCH and the sPUCCH overlap or the difference between the start or end times of a PDCCH/PDSCH and a sPDCCH/sPDSCH is less than or equal to a threshold value preset in the high layer.

Option 1-2: UCI to be transmitted via a PUCCH may be separately coded according to the TTI size (or group). That is, the UCI corresponding to the PUCCH may be encoded and mapped to REs using a scheme for transmitting only the PUCCH. Next, the UCI corresponding to the sPUCCH may be separately encoded and then mapped in a manner of puncturing or rate-matching a particular RE of the PUCCH. Alternatively, when the phase is rotated by a symbol modulated in a particular sequence, such as in PUCCH 1a/1b, the phase may be further rotated by further multiplying the particular sequence by an additionally coded modulation symbol according to the UCI for the sPUCCH. In this case, since encoding time is managed separately for each UCI, it may be advantageous in that constraints are relaxed on the timing relationship between the PDCCH/PDSCH and the sPDCCH/sPDSCH.

Option 2: All or some of pieces of UCI are transmitted via a sPUCCH. In this case, the UCI may be a UCI set or subset to be transmitted on the PUCCH and the sPUCCH. Generally, since coverage for the sPUCCH may be narrower than coverage for the PUCCH. Therefore, in order to ensure the coverage of a general PUCCH, the sPUCCH may be repeatedly transmitted during a plurality of shortened TTIs (e.g., 1 ms) predefined or set by the high layer. In repeated transmission, UCI mapped to the plurality of TTIs may be in a form such that the UCI is encoded for each TTI and the value is repeated (self-decodable). Alternatively, the UCI may be encoded for the corresponding interval, and each of the coded bits may be distributed and mapped differently according to the TTI. When the coded bits are distributed and mapped by TTI, it is necessary to receive and decode a plurality of sPUCCHs in order to obtain UCI corresponding to the PUCCH. Specific examples of a UCI transmission method are illustrated as follows.

Option 2-1: Only UCI corresponding to a sPUCCH is transmitted in a time interval during which the sPUCCH occurs, and UCI corresponding to a PUCCH is repeatedly transmitted using a sPUCCH in the remaining (repetition) interval.

Option 2-2: Pieces of UCI corresponding to a sPUCCH and a PUCCH are transmitted in a time interval during which the sPUCCH occurs. Specifically, the sPUCCH and the PUCCH may be jointly coded. In the remaining (repetition) interval, the UCI corresponding to a PUCCH is repeatedly transmitted using the sPUCCH.

Option 2-3: Pieces of UCI corresponding to a sPUCCH and a PUCCH are transmitted in a time interval (i.e., repetition interval) scheduled for PUCCH transmission.

Option 3: A sPUCCH and a PUCCH are multiplexed. In this case, all or some of some channels may be dropped at a certain time.

Option 3-1: Transmission of a sPUCCH may not be expected in a subframe where a PUCCH is transmitted. Specifically, the sPDCCH is not monitored in the corresponding TTI.

Option 3-2: A PUCCH is dropped in a subframe where a sPUCCH is transmitted, which may be performed in a limited case where the presence of the sPUCCH can be recognized before transmitting the PUCCH. For example, when the time to transmit the sPUCCH is set by the high layer or when the occurrence of the sPUCCH can be known by a look-ahead operation, the PUCCH may be dropped in the subframe where the sPUCCH is transmitted. Otherwise, the PUCCH may be partly dropped or the sPUCCH may be dropped. Generally, the sPUCCH may be for a service of an urgent application. In this case, it may be desirable to assign a high priority to the sPUCCH. Further, after a PDCCH or a PDSCH corresponding to the PUCCH is transmitted, a sPDCCH or a sPDSCH corresponding to the sPUCCH may be transmitted. In this case, it can be understood that a base station has intentionally performed additional scheduling.

Option 3-3: A PUCCH is partly dropped in a slot where a sPUCCH is transmitted. In this case, the base station may detect UCI corresponding to the PUCCH from the transmitted part of the PUCCH. When an orthogonal cover code (OCC) is applied to the PUCCH on the time axis, orthogonality may not be guaranteed by dropping only some symbols, and thus the PUCCH may be dropped at least by slot.

Option 3-4: A PUCCH is partly dropped in a symbol where a sPUCCH is transmitted, which may be performed in a limited case where an OCC is not applied to the PUCCH on the time axis. The base station may detect UCI from the transmitted part of the PUCCH.

When UCI corresponding to the sPUCCH and UCI corresponding to the PUCCH are jointly coded, it is necessary to specify the order in which at least the same type of UCI is indexed or placed. The UCI corresponding to the sPUCCH may be mapped to be placed with the previous index. In this case, the UCI corresponding to the sPUCCH may be robust against an error in rate matching (RM) coding. Alternatively, the pieces of UCI may be mapped such that UCI is placed with the preceding index according to the order of earlier transmission start or end time of the sPUCUC or PUCCH.

In order to solve the collision problem described above, a default TTI size may be set for a UE. The default TTI size may be considered as a TTI size configured for UCI transmission and/or uplink data transmission. A semi-persistent scheduling (SPS) PUSCH and all settings may be configured depending on the default TTI size. The default TTI size may be considered as a legacy TTI size before the configuration of an operation for a shortened TTI, but may be reset after the configuration of an operation for a shortened TTI. It may be assumed that UCI transmission using a TTI size different from the default TTI size is aperiodically triggered by DCI. If triggered, such transmission may be assumed to have a higher priority than a periodically and semi-statically configured setting. Such transmission may include HARQ ACK/NACK transmission. HARQ ACK/NACK transmission may be performed using a TTI size different from the default TTI size only after resources are set through DCI.

In a case of a downlink carrier having a TTI size set to be different from the default TTI size, the timing of HARQ ACK/NACK transmission may be determined according to the TTI size of the downlink carrier, and a channel for HARQ ACK/NACK transmission may be transmitted according to the default TTI size. For example, when the TTI of the downlink carrier is a legacy TTI and the default TTI size is 7 symbols, the ACK/NACK may be assumed to be mapped to a first or second TTI of two shortened TTIs in a subframe selected on the basis of the timing determined on the legacy TTI. Such a scheme may be applied to a case where a plurality of TTIs is configured for a single carrier. In particular, for an uplink carrier, it is assumed that a TTI size used per carrier is the same, and the size of a configured TTI falls back to the legacy TTI size when an initial access procedure is performed. In a PRACH procedure triggered by a PDCCH order, after receiving a RAR, the TTI size may return to the size of the basic TTI previously configured, or a TTI size may be configured through the RAR.

As described above, when a TTI size is configured per carrier, it may be assumed that another default TTI size is not configured for one carrier group. One carrier group may have a carrier for transmitting one PUCCH. When a carrier group does not have any carrier for transmitting a PUCCH, ACK/NACK transmission may be performed only by an aperiodic request or may be performed through PUSCH-type PUCCH transmission. It may be assumed that a sPUCCH can be transmitted on all carriers. However, one carrier may be set to transmit a sPUCCH in one carrier group. The carrier transmitting the sPUCCH may be a cell different from a downlink PCell, a pSCell, or a SCell transmitting a PUCCH.

Figure 11:
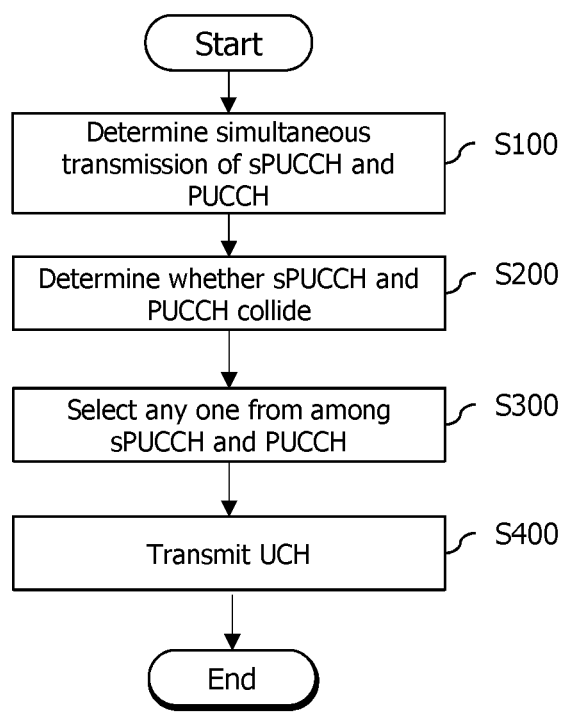
FIG. 11 is a flowchart illustrating a method for reporting uplink control information according to an embodiment of the present invention.

FIG. 11 is a flowchart illustrating a method for reporting uplink control information according to an embodiment of the present invention.

Referring to FIG. 11, a UE determines whether simultaneous transmission of a sPUCCH configured with a shortened TTI and a PUCCH configured with a normal TTI is allowed (S100). In this case, the size of the shortened TTI may be less than 1 msec, and the size of the normal TTI may be 1 msec. The UE may determine whether the simultaneous transmission of the sPUCCH and the PUCCH is allowed on the basis of high-layer signaling.

When the simultaneous transmission of the sPUCCH and the PUCCH is allowed, the UE determines whether resources for the sPUCCH and resources for the PUCCH entirely or partly overlap (S200). That is, the UE determines whether the sPUCCH collides with the PUCCH.

When the sPUCCH and the PUCCH collide with each other, the UE selects either the sPUCCH or the PUCCH (S300). The UE transmits pieces of UCI through the selected channel (S400).

Specifically, the UE may select the PUCCH and may transmit the pieces of UCI through the selected PUCCH. In this case, the UE may piggyback UCI to be transmitted through the sPUCCH on the PUCCH and may transmit the UCI. Here, the UE may jointly code and transmit the same type of UCI among the pieces of UCI to be transmitted through the sPUCCH and the PUCCH. In addition, the UE may separately code and transmit the pieces of UCI to be transmitted through the sPUCCH and the PUCCH on the basis of the TTI size.

The UE may select the sPUCCH and transmit the pieces of UCI via the selected sPUCCH. In this case, the UE may repeatedly transmit the pieces of UCI in order to ensure the coverage of the PUCCH.

The aforementioned embodiments of the present invention can be implemented through various means. For example, the embodiments of the present invention can be implemented in hardware, firmware, software, combination of them, etc. Details thereof will be described with reference to the drawing.

Figure 12:
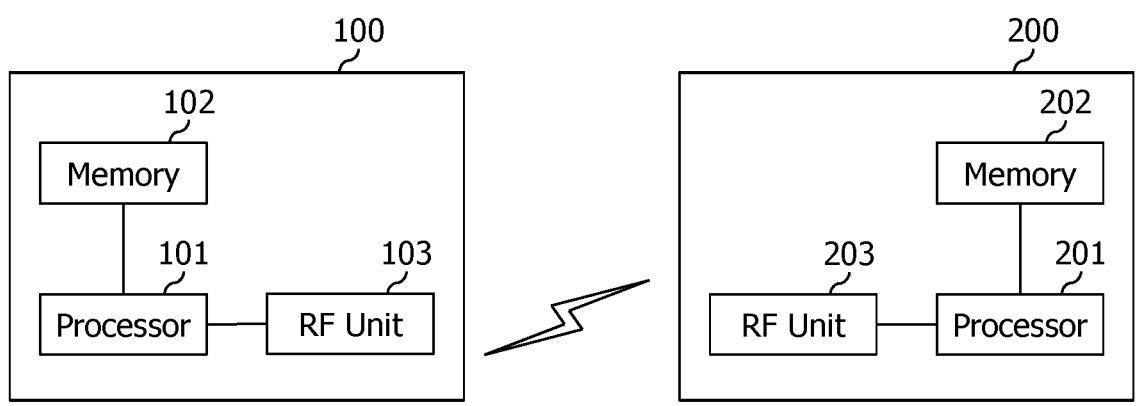
FIG. 12 is a block diagram illustrating a wireless communication system according to an embodiment of the present invention.

FIG. 12 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 101.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A transmission method for a user equipment (UE), the method comprising:
   determining, by the UE, whether a first physical uplink control channel (PUCCH) signal collides with a second PUCCH signal;
   wherein the first PUCCH signal is to be transmitted based on a first length of a transmission time interval (TTI), and wherein the second PUCCH signal is to be transmitted based on a second length being shorter than the first length of the TTI; and based on (i) that the first PUCCH signal is used to convey hybrid automatic repeat request (HARQ) acknowledgement/negative-acknowledgement (ACK/NACK) information and (ii) that the first PUCCH signal collides with the second PUCCH signal, transmitting, by the UE to a base station, the HARQ ACK/NACK information via the second PUCCH signal.

2. The method of claim 1, further comprising:

performing a piggy back of the HARQ ACK/NACK information onto the second PUCCH signal which is based on the second length being shorter than the first length of the TTI.

3. The method of claim 1, wherein the HARQ ACK/NACK information is associated with a physical downlink shared channel (PDSCH) which is received based on the first length of the TTI.

4. The method of claim 1, wherein the second length being shorter than the first length of the TTI is configured by a higher layer signal.

5. The method of claim 1, wherein the second length being shorter than the first length of the TTI is a length of one slot.

6. The method of claim 1, wherein the HARQ ACK/NACK information is transmitted via the second PUCCH signal in a first slot of the TTI.

7. The method of claim 1, further comprising:

determining, by the UE, to drop the first PUCCH, based on that the first PUCCH signal collides with the second PUCCH signal.

8. A user equipment (UE) comprising:

a processor configured to:

determine whether a first physical uplink control channel (PUCCH) signal collides with a second PUCCH signal, and wherein the first PUCCH signal is to be transmitted based on a first length of a transmission time interval (TTI), and wherein the second PUCCH signal is to be transmitted based on a second length being shorter than the first length of the TTI; and a radio frequency (RF) unit configured to transmit hybrid automatic repeat request (HARQ) acknowledgement/negative-acknowledgement (ACK/NACK) information via the second PUCCH signal, based on (i) that the first PUCCH signal is used to convey the HARQ ACK/NACK information and (ii) that the first PUCCH signal collides with the second PUCCH signal.

9. The UE of claim 8, wherein the processor is further configured to:

perform a piggy back of the HARQ ACK/NACK information onto the second PUCCH signal which is based on the second length being shorter than the first length of the TTI.

10. The UE of claim 8, wherein the HARQ ACK/NACK information is associated with a physical downlink shared channel (PDSCH) which is received based on the first length of the TTI.

11. The UE of claim 8, wherein the second length being shorter than the first length of the TTI is configured by a higher layer signal.

12. The UE of claim 8, wherein the second length being shorter than the first length of the TTI is a length of one slot.

13. The UE of claim 8, wherein the HARQ ACK/NACK information is transmitted via the second PUCCH signal in a first slot of the TTI.

14. The UE of claim 8, wherein the processor is further configured to:

determine to drop the first PUCCH, based on that the first PUCCH signal collides with the second PUCCH signal.

* * * * *